US011467892B2

(12) United States Patent
Nore et al.

(10) Patent No.: US 11,467,892 B2
(45) Date of Patent: Oct. 11, 2022

(54) INTER-PROCESSOR COMMUNICATION

(71) Applicant: Nordic Semiconductor ASA, Trondheim (NO)

(72) Inventors: Anders Nore, Trondheim (NO); Joar Rusten, Trondheim (NO); Steffen Wiken, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 148 days.

(21) Appl. No.: 16/966,179

(22) PCT Filed: Jan. 30, 2019

(86) PCT No.: PCT/EP2019/052205
§ 371 (c)(1),
(2) Date: Jul. 30, 2020

(87) PCT Pub. No.: WO2019/149731
PCT Pub. Date: Aug. 8, 2019

(65) Prior Publication Data
US 2021/0034442 A1 Feb. 4, 2021

(30) Foreign Application Priority Data

Jan. 31, 2018 (GB) ...................................... 1801572

(51) Int. Cl.
*G06F 9/54* (2006.01)
*G06F 13/24* (2006.01)
(Continued)

(52) U.S. Cl.
CPC ................ *G06F 9/542* (2013.01); *G06F 1/28* (2013.01); *G06F 9/4418* (2013.01); *G06F 9/546* (2013.01); *G06F 13/24* (2013.01); *G06F 13/4027* (2013.01)

(58) Field of Classification Search
None
See application file for complete search history.

(56) References Cited

U.S. PATENT DOCUMENTS 3,997,896 A 12/1976 Cassarino, Jr. et al.
5,664,200 A 9/1997 Barlow et al.
(Continued)

FOREIGN PATENT DOCUMENTS

GB 2497528 A 6/2013
WO WO 2016/203193 A1 12/2016

OTHER PUBLICATIONS

IPO Search Report under Section 17(5) for GB 1801572.7, dated Jul. 24, 2018, 3 pages.
(Continued)

*Primary Examiner* — Umut Onat
(74) *Attorney, Agent, or Firm* — Klarquist Sparkman, LLP

(57) ABSTRACT

A semiconductor integrated-circuit device comprises two processing subsystems, each comprising a respective processor, set of local peripherals, and bridge unit, all connected to a respective local bus. An electrical interconnect joins the respective bridge units. The first bridge unit comprises a task register, accessible over the first local bus, and can be configured to detect a write to the task register, and respond by sending an event signal over the interconnect to the second bridge unit. The second bridge unit can be configured to receive the event signal, and respond by sending an interrupt signal to the second processor.

19 Claims, 6 Drawing Sheets

(51) Int. Cl.
　　　*G06F 1/28*　　　(2006.01)
　　　*G06F 9/4401*　　(2018.01)
　　　*G06F 13/40*　　(2006.01)

(56) References Cited

U.S. PATENT DOCUMENTS

| | | | |
|---|---|---|---|
| 6,463,492 B1* | 10/2002 | Engfer | G06F 9/4812 |
| | | | 710/260 |
| 8,464,281 B2* | 6/2013 | Mebane, III | G06F 9/542 |
| | | | 717/124 |
| 9,141,494 B2* | 9/2015 | Arroyo | G06F 13/405 |
| 10,318,359 B2* | 6/2019 | Mebane, III | G06F 8/315 |
| 2008/0270656 A1 | 10/2008 | Bracamontes Del Toro | |
| 2015/0113184 A1 | 4/2015 | Stanford-Jason et al. | |
| 2015/0362980 A1 | 12/2015 | Tripathi | |
| 2016/0267038 A1 | 9/2016 | Elahi et al. | |

OTHER PUBLICATIONS

International Search Report and Written Opinion for PCT/EP2019/052205, dated May 15, 2019, 14 pages.
CoreSight™ Components Technical Reference Manual, Jul. 10, 2009, 376 pages.
SAM4C Series, Atmel 1 SMART ARM-based Flash MCU Datasheet, Mar. 27, 2015, 1,296 pages.

* cited by examiner

```
┌─────────────────────────────────────────────────────────┐
│ Providing an integrated circuit device comprising first │
│ processing circuitry comprising a first local bus; a first│
│ processor connected to the first local bus; a first set of one or│
│ more local peripherals connected to the first local bus; and first│
│ bridge unit circuitry connected to the first local bus and│
│ comprising a task register, accessible over the first local bus;│ 601
│ second processing circuitry comprising: a second local bus; a│
│ second processor connected to the second local bus; a second│
│ set of one or more local peripherals connected to the second│
│ local bus; second bridge unit circuitry connected to the second│
│ local bus; and a local-event line, between the second bridge│
│ unit circuitry and a peripheral of the second set of peripherals,│
│ for sending a local event signal from the second bridge unit│
│ circuitry to said peripheral; and an electrical interconnect│
│ between the first bridge unit circuitry and the second bridge unit│
│ circuitry                                                │
└─────────────────────────────────────────────────────────┘
                            │
                            ▼                              602
┌─────────────────────────────────────────────────────────┐
│ The first processor, or one or more of the first set of local│
│ peripherals, writing to the task register of the first bridge unit│
│ circuitry                                                │
└─────────────────────────────────────────────────────────┘
                            │
                            ▼                              603
┌─────────────────────────────────────────────────────────┐
│ The first processor, or one or more of the first set of local│
│ peripherals, writing to the task register of the first bridge unit│
│ circuitry the second bridge unit circuitry receiving the event│
│ signal from the first bridge unit circuitry and responding by│
│ sending an interrupt signal to the second processor      │
└─────────────────────────────────────────────────────────┘
                            │
                            ▼                              604
┌─────────────────────────────────────────────────────────┐
│ The second bridge unit circuitry sending a local event signal to│
│ a peripheral of the second set of peripherals in response to│
│ receiving said event signal, or in response to receiving a further│
│ event signal over the electrical interconnect            │
└─────────────────────────────────────────────────────────┘
```

FIG. 6

INTER-PROCESSOR COMMUNICATION

CROSS REFERENCE TO RELATED APPLICATIONS

This is the U.S. National Stage of International Application No. PCT/EP2019/052205, filed Jan. 30, 2019, which was published in English under PCT Article 21(2), which in turn claims the benefit of Great Britain Application No. 1801572.7, filed Jan. 31, 2018.

This invention relates to inter-processor communication on an integrated-circuit device that has multiple processing units.

It is known for integrated-circuit devices, such as system-on-chip (SoC) devices, to contain multiple separate processing units or microcontrollers, each having its own processor, local bus, and peripherals. It is known to provide a bridge between the two local buses. For example, a synchronous or asynchronous AHB-AHB bridge from ARM$^{SM}$ provides a unidirectional link between two ARM™ Advanced High-Performance Bus (AHB) domains.

The SAM4C Series device from Atmel™ contains two sub-systems each having a respective ARM™ Cortex-M4 processor. Each sub-system has a respective ARM™ Advanced Peripheral Bus (APB), a respective ARM™ AHB, and a respective inter-processor communication (IPC) module connected to the respective APB. Bridges between the buses provide a path that enables the processor of one sub-system to interrupt the processor of the second sub-system by writing to an "interrupt set" register of the IPC module of the second sub-system, and vice versa.

However, providing bridges between buses of different processing units on a single device is not always desirable. It can, for instance, create security concerns by allowing one processing unit to have unrestricted access to the memory map of the other processing unit. This may allow malicious or faulty software on one processing unit to interfere with the normal operation of the other processing unit. Even where a device does have a bridge between respective buses, it may still be desirable to provide an alternative mechanism for allowing inter-processor communication. This may, for example, be useful to avoid possible timing issues when using a bridge.

The present invention thus seeks to provide a novel mechanism for inter-processor communication.

From a first aspect, the invention provides an integrated circuit device comprising:
a first processing subsystem comprising:
  a first local bus;
  a first processor connected to the first local bus;
  a first set of one or more local peripherals connected to the first local bus; and
  a first bridge unit connected to the first local bus;
a second processing subsystem comprising:
  a second local bus;
  a second processor connected to the second local bus;
  a second set of one or more local peripherals connected to the second local bus; and
  a second bridge unit connected to the second local bus; and
an electrical interconnect between the first bridge unit and the second bridge unit,
wherein:
the first processing subsystem, the second processing subsystem, and the electrical interconnect are integrated on a common semiconductor substrate;
the first bridge unit comprises a task register, accessible over the first local bus;
the first bridge unit is configured, or is configurable, to:
  detect a write to the task register; and
  respond to the write by sending an event signal over the electrical interconnect to the second bridge unit, and
the second bridge unit is configured, or is configurable, to:
  receive the event signal from the first bridge unit; and
  send an interrupt signal to the second processor in response to receiving the event signal.

From a second aspect, the invention provides a method of operating an integrated circuit device, the integrated circuit device comprising:
a first processing subsystem comprising:
  a first local bus;
  a first processor connected to the first local bus;
  a first set of one or more local peripherals connected to the first local bus; and
  a first bridge unit connected to the first local bus and comprising a task register, accessible over the first local bus;
a second processing subsystem comprising:
  a second local bus;
  a second processor connected to the second local bus;
  a second set of one or more local peripherals connected to the second local bus; and
  a second bridge unit connected to the second local bus; and
an electrical interconnect between the first bridge unit and the second bridge unit,
wherein the method comprises:
the first processor, or one or more of the first set of local peripherals, writing to the task register of the first bridge unit;
the first bridge unit detecting the write to the task register and responding by sending an event signal over the electrical interconnect to the second bridge unit;
the second bridge unit receiving the event signal from the first bridge unit and responding by sending an interrupt signal to the second processor.

Thus it will be seen by those skilled in the art that, in accordance with the invention, an interconnect between two bridge units enables a processor or peripheral on the first subsystem to interrupt the processor of the second subsystem by writing to a task register on the first subsystem. This arrangement does not require there to be a bridge between the first and second local buses (although this possibility is not excluded).

The integrated-circuit device may be any device, such as system-on-chip device or a radio-on-chip device. It may be integrated on a silicon substrate. It may comprise connections for connecting to one or more external circuit components, such as a power supply, a crystal oscillator, a capacitor, an antenna, a display screen, a sensor, etc.

The local peripherals may include any peripherals, such as timers, ADCs, DACs, data interfaces, etc.

The task register may be a single-bit register. It may be addressable by the first processor. It may be addressable by one or more of the first set of peripherals. One or more of the first set of peripherals may be configured to write to the task register, directly or indirectly—for example, using direct memory access (DMA). One or more of the peripherals of the first set may be able to become a bus master for the first local bus. The device may be such that the task register is not accessible (e.g., addressable) over the second local bus; this can enhance security. However, in other embodiments it may be addressable—e.g., if there is a bridge between the first local bus and the second local bus.

The first bridge unit may be configured to detect a write to the task register by the first processor and/or by one or more of the first set of local peripherals.

In embodiments in which the first bridge unit is configurable to detect a write to the task register and/or respond to the write by sending an event signal over the electrical interconnect, the first bridge unit may comprise an input for enabling and disabling this behaviour or these behaviours—i.e. for controlling whether or not the first bridge unit detects a write to the task register and/or responds to the write by sending an event signal over the electrical interconnect. The input may be a register interface. It may comprise one or more single-bit registers, which may be accessible over the first local bus. One or more values in the register interface may determine whether or not the detection and/or response is enable or disabled. The first processor (or potentially a local peripheral) may thereby be able to enable and disable said response.

In embodiments in which the second bridge unit is configurable to receive the event signal from the first bridge unit and/or send an interrupt signal to the second processor in response to receiving the event signal, the second bridge unit may comprise an input for controlling whether or not the second bridge unit receives the event signal and/or sends an interrupt signal in response. The input may be a register interface. It may comprise one or more single-bit registers, which may be accessible over the second local bus. One or more values in the register interface may determine whether or not the detection and/or response is enable or disabled. The second processor (or potentially a local peripheral) may thereby be able to enable and disable said response.

The second processor may be configured to wake from a sleep state in response to receiving the interrupt signal from the second bridge unit. This can allow the first processor to wake the second processor even when the second processor is substantially or completely powered down.

In some embodiments, the first processing subsystem may be in a first power domain and the second processing subsystem may be in a second power domain. The first power domain and the second power domain may be subsidiary power domains of a higher-level (eg. top-level) power domain. The higher-level power domain may include further subsidiary power domains in addition to the first and second power domains.

It may be possible for a power domain to be powered up whilst the processor of that power domain continues to be in a sleep state (e.g., clock gated). Further, it may be possible for an individual processing subsystem to have multiple power domains. For example, the processor of a subsystem may be in a different power domain to its bridge unit.

The higher-level power domain may comprise a power status module that is configured to monitor the power-on status of each of the subsidiary power domains. The power-on status of each subsidiary power domain may be used by the power status module to keep the higher-level power domain on as long as one or more of the subsidiary power domains remains on.

Bridge units in power domains that are powered up may, prior to sending an event signal, send a power-on request signal to the power status module. This can be done to ensure the target bridge unit is powered up, before the event signal is sent. The power status module may monitor for event signals or power-on request signals from any of the bridge units in the respective subsidiary power domains. If an event signal or a power-on request signal is detected, the power status module may turn on one, some or all of the other subsidiary power domains. This may be done, for example, by the power status module turning on a power switch for each such power domain.

The bridge units of the power domains that are turned on by the power status module may each send a power-on report signal to the power status module. The power-on report signal from each bridge unit can inform the power status module that the respective power domain is now on. Upon receiving the power-on report signal, the power status module may send a ready signal to a bridge unit that sent a power-on request signal to the power status module, and optionally to some or all of the other bridge units also.

After receiving the ready signal, the bridge unit that sent the power-on request signal may send a wake-up event signal over the electrical interconnect to a bridge unit of a processing subsystem whose processor is in a sleep state; the latter bridge unit may then send an interrupt to its processor, and; the processor may wake up from the sleep state.

For example, the first power domain may be powered up while the second power domain is powered down. The first bridge unit may send a power-on request signal to the power status module over the electrical interconnect. The power status module may receive the power-on request signal and may turn on power switches of some or all the power domains, including the second power domain. The second power domain may then be powered up. The bridge unit of the second power domain may then send a power-on report signal to the power status module. The power status module may then send a ready signal to the first bridge unit. The first bridge unit may then send a wake-up event signal over the electrical interconnect to the second bridge unit. The second bridge unit may then receive the wake-up event signal from the first bridge unit over the electrical interconnect and the second bridge unit may respond by sending a wake-up interrupt signal to the second processor. The second processor then wakes up and performs an operation.

In general, the second processor may be configured to execute an interrupt routine in response to receiving the interrupt signal.

The device may comprise a shared memory. The first processing subsystem and the second processing subsystem may both be configured to access the shared memory.

The device may comprise a code memory. The code memory may store first software instructions which, when executed by the first processor, cause the first processor to write data to the shared memory. The code memory may additionally or alternatively store second software instructions which, when executed by the second processor, cause the second processor to read data from the share memory in response to the second processor receiving the interrupt signal. The code memory may be accessible by the first subsystem and by the second subsystem, or it may comprise a first code memory region accessible by the first subsystem and a second code memory region accessible by the second subsystem. The first code memory region may be inaccessible to the second subsystem. The second code memory region may be inaccessible to the first subsystem.

The first software instructions may include instructions which, when executed by the first processor, cause the first processor to configure the first bridge unit to detect the write to the task register and respond to the write by sending an event signal over the electrical interconnect to the second bridge unit.

The second software instructions may include instructions which, when executed by the second processor, cause the second processor to configure the second bridge unit to receive the event signal from the first bridge unit and send an interrupt signal to the second processor in response to receiving the event signal.

The task register may be writable by one or more of the first set of local peripherals when the first processor is in a sleep state—e.g., using DMA.

The first bridge unit may comprise an interface, additional to the task register, for receiving a task signal. The first bridge unit may be configured, or be configurable, to respond to such a task signal by sending an event signal over the electrical interconnect to the second bridge unit. The interface may comprise one or more lines (e.g., electrical wires for carrying a single-bit signal) connected to one or more of the first set of peripherals. In this way, a peripheral on the first subsystem may be able to cause the first bridge unit to send an event signal, even if the peripheral cannot write to the task register, by sending a task signal to the first bridge unit. This may be possible while the first processor is in a sleep state.

The second bridge unit may also comprise a second task register. The second bridge unit may be configured, or be configurable, to:
  detect a write to the second task register; and
  respond to the write by sending an event signal over the electrical interconnect to the first bridge unit.

The first bridge unit may be configured, or be configurable, to:
  receive an event signal from the second bridge unit; and
  send an interrupt signal to the first processor in response to receiving said event signal.

In this way, two way communication between the first and second processors is possible over the electrical interconnect.

The electrical interconnect may comprise a plurality of communication channels. A first communication channel may be used for sending event signals from the first bridge unit to the second bridge unit. A second communication channel may be used for sending event signals from the second bridge unit to the first bridge unit.

The first bridge unit may comprise a plurality of task registers and may be configured, or be configurable, for each of the task registers, to:
  detect a write to the task register; and
  respond to the write by sending an event signal over the electrical interconnect to the second bridge unit.

The first bridge unit may comprise a configuration interface for determining which one or more of a plurality of communication channels in the electrical interconnect an event signal is sent over. The first processor may be able to control the configuration interface, which may, for example, be a register interface.

This can enable the device to be configured to support a plurality of different actions depending on which task register of the plurality of task registers is written to.

The interrupt signal may be sent over an interrupt line. The interrupt signal may be a level-triggered interrupt, an edge-triggered interrupt, or a message-triggered interrupt.

The second bridge unit may be configured, or be configurable, to:
  receive an event signal from the first bridge unit over the electrical interconnect, wherein the electrical interconnect comprises a plurality of communication channels; and
  send an interrupt signal to the second processor, over an interrupt line of a plurality of interrupt lines, in response to receiving the event signal, wherein the second bridge unit determines which interrupt line to send the interrupt signal over depending on which communication channel the second bridge unit receives the event signal over.

The second bridge unit may comprise a configuration interface for connecting one or more of a plurality of interrupt lines to one or more of a plurality of communication channels in the electrical interconnect. The second processor may be able to control the configuration interface, which may, for example, be a register interface.

This can enable the device to be configured to support a plurality of different actions depending on which communication channel an event signal is sent over. This may, in turn, depend on which task register is written to, or which task signal is received by the first bridge unit.

The second bridge unit may be configured, or be configurable, to send a local event signal to a peripheral of the second set of peripherals in response to receiving the aforesaid event signal over the electrical interconnect. The second bridge unit may be configured, or be configurable, to send a local event signal to a peripheral of the second set of peripherals in response to receiving a further event signal over the electrical interconnect, wherein the second bridge unit is configured not to send an interrupt signal to the second processor in response to receiving the further event signal. Whether or not event signals cause the sending of an interrupt signal to the second processor may be configurable independently for each communication channel—e.g., using the configuration interface of the second bridge unit. The local event signal may be sent over a local-event line (e.g., an electrical wire for carrying a single-bit signal within the second processing subsystem) connecting between the second bridge unit and the peripheral. The second processing subsystem may comprise one or more local-event signal lines connecting from the second bridge unit to one or more peripherals of the second set of peripherals.

The second bridge unit may comprise an event output register, and may be configured, or be configurable, to change a value of the event output register in response to receiving the event signal over the electrical interconnect. This can enable a peripheral of the second set of local peripherals (or the second processor) to poll the event output register at intervals to determine when an event signal has been received by the second bridge unit.

The first subsystem may comprise a first programmable peripheral interface (PPI), such as described in the applicant's earlier publication WO 2013/088121, the entire contents of which are hereby incorporated by reference. The second subsystem may comprise a such programmable peripheral interface (PPI) (referred to hereafter, for convenience, as the "second PPI", although this should not be taken as implying there will always be a first PPI). The first PPI may be regarded as a peripheral; so the first set of peripherals may include the first PPI. The first PPI may be connected to the first bridge unit by one or more signal lines. The first bridge unit may be configured to receive a task signal from the PPI and to respond by sending an event signal over the electrical interconnect. The second set of peripherals may include the second PPI. The second PPI may be connected to the second bridge unit by one or more local-event signal lines. The second bridge unit may be configured to send a local event signal to the PPI in response to receiving an event signal over the electrical interconnect. The device may be configured so that a peripheral of the first set of peripherals can trigger the sending of an event signal over the electrical interconnect by sending a signal to the first PPI. The device may be configured so that a peripheral of the second set of peripherals can receive a task signal from the second PPI in response to the second bridge unit receiving the event signal over the electrical interconnect.

The electrical interconnect between the first bridge unit and second bridge unit may thus be configurable to act as a peripheral-to-peripheral bridge, connecting one or more of the first set of peripherals with one or more of the second set of peripherals.

In some embodiments, this may occur directly and without sending an interrupt signal to the first or second processors.

The first bridge unit may be in a first clock domain. The second bridge unit may be in a second clock domain, different from the first clock domain. The event signal may be sent over the electrical interconnect asynchronously.

The device may comprise one or more further processing subsystems. Each further processing subsystem may comprise:
- a respective local bus;
- a respective processor connected to the local bus;
- a respective set of one or more local peripherals connected to the local bus; and
- a respective bridge unit connected to the local bus.

Each such bridge unit may be connected to, or may be switchably connectable to, the electrical interconnect.

Each such bridge unit may comprise a respective task register and be configured, or be configurable, to:
- detect a write to the task register; and
- respond to the write by sending an event signal over the electrical interconnect.

Each such bridge unit may additionally or alternatively be configured, or be configurable, to:
- receive an event signal over the electrical interconnect; and
- send an interrupt signal to its respective processor in response to receiving the event signal.

In this way, three or more processors can communicate with each other. The communication may be in a one-to-many, or many-to-one, or many-to-many fashion. This is possible even where there is no memory bus connection, or only a limited bus connection (e.g., one-way only) between two or more of the processing subsystems.

Features described herein with reference to the first bridge unit or first subsystem may also be features of the second bridge unit or second subsystem, or of any further bridge unit or subsystem. Similarly, features described herein with reference to the second bridge unit or second subsystem may also be features of the first bridge unit or subsystem, or of any further bridge unit or subsystem.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which:

FIG. 6 shows a flow chart consisting of an exemplary method including steps 601, 602, 603, and 604.

Figure 1:
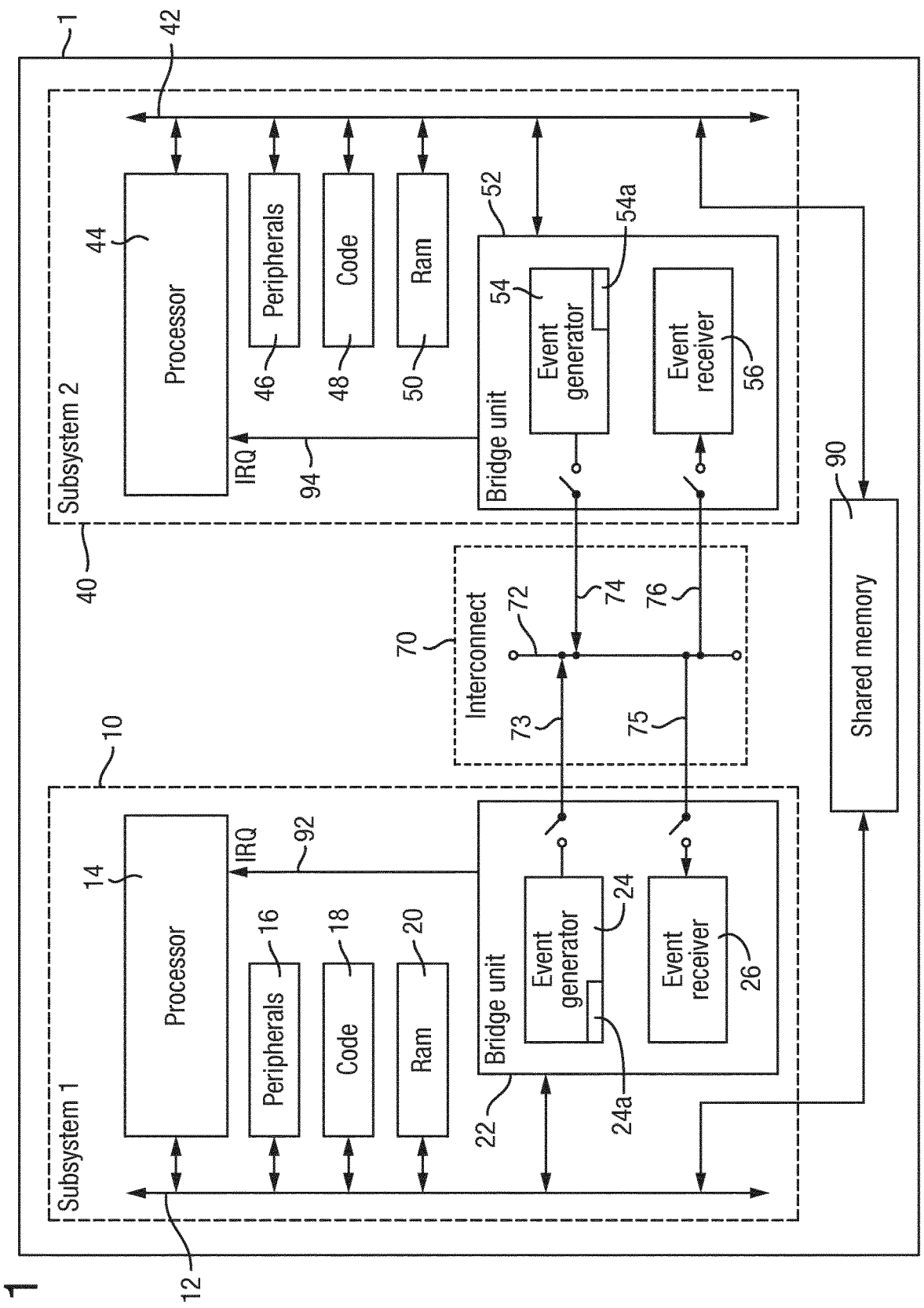
FIG. 1 is a schematic drawing showing components of a first integrated circuit device, in accordance with the invention, which comprises two different subsystems connected by an interconnect.

FIG. 1 shows an integrated microcontroller unit (MCU) device 1. It has a first subsystem 10 and a second, separate subsystem 40.

The first subsystem 10 includes a first local processor 14 (e.g. an ARM™ Cortex-M4) which is communicatively connected to other components of the subsystem by a first local bus 12. This bus 12 may be implemented as a single bus, or as multiple buses—e.g., an ARM™ Advanced High Performance Bus (AHPB) and an ARM™ Advanced Peripheral Bus (APB). The other components include a first set of one or more local peripherals 16 (e.g. a serial connection, a timer, a digital-to-analogue converter, etc.); a first non-volatile code memory 18, for storing software instructions; a first RAM 20; and a first bridge unit 22. The device 1 may, of course, include other conventional components not shown in FIG. 1.

The second subsystem 40 is similar to the first subsystem 10. It includes a second local processor 44 (e.g. an ARM™ Cortex-M4) which is communicatively connected to other components of the subsystem by a second local bus 42. Again, this may be implemented as a single bus or as multiple buses. These other components include a second set of one or more local peripherals 46 (e.g. a serial connection, a timer, a digital-to-analogue converter, etc.); a second non-volatile code memory 48, for storing software instructions; a second RAM 50; and a second bridge unit 52. It may, of course, include other conventional components.

In some embodiments, the first code memory 18 and second code memory 48 may be respective regions of a common code memory. Similarly, the first RAM 20 and second RAM 50 may be respective regions of a common RAM.

The first and second subsystems 10, 40 and/or first and second processors 14, 44 may receive a common clock signal—e.g., from an off-chip crystal oscillator, or from an on-chip clock source—or they may receive different respective clock signals. The first subsystem 10 may or may not be synchronised to the second subsystem 40. The two subsystems 10, 40 may run at different clock frequencies and/or phases.

Also connected to the local bus 12, 42 of each subsystem 10, 40 is a shared memory unit 90. The first processor 14 and the second processor 44 can both read and write to a common set of addresses in the shared memory unit 90.

Each subsystem 10, 40 also has a respective dedicated interrupt line 92, 94 between its bridge unit 22, 52 and its processor 14, 44, which enables each bridge unit 22, 52 to issue an interrupt signal, IRQ (Interrupt Request), to its respective processor 14, 44 via the respective interrupt I 92, 94.

An electrical interconnect 70 provides a communication channel 72 for carrying event signals between the bridge units 22, 52.

The bridge unit 22 of the first subsystem 10 comprises an event generator 24, an event receiver 26, a switched output connection 73 linking the event generator 24 to the communication channel 72 of the interconnect 70, and a switched input connection 75 linking the communication channel 72 of the interconnect 70 to the event receiver 26. The switched connections 73, 75 can be opened or closed under the control of the first processor 14, by writing a respective bit value to a control register for the bridge unit 22.

Similarly, the bridge unit 52 of the second subsystem 40 comprises an event generator 54, an event receiver 56, a switched output connection 74 linking the event generator 54 to the communication channel 72 of the interconnect 70, and a switched input connection 76 linking the communication channel 72 of the interconnect 70 to the event receiver 56. The switched connections 74, 76 can be opened or closed under the control of the second processor 44, by writing a respective bit value to a control register for the bridge unit 52.

The bridge units 22, 52 comprise hardware (logic gates, wires, etc.) that is separate from, and additional to, the hardware of the respective processors 14, 44. The bridge units 22, 52 may effectively be additional peripherals. The interconnect 70 may consist only of wires and connections, or it may comprise one or more transistors or logic gates. It will be appreciated that what is considered part of the bridge units 22, 52 and what is considered part of the interconnect 70 is not necessarily fixed.

In use, software stored in the first code memory 18 can instruct the first processor 14 to configure the first bridge unit 22 to close the switched connection 73 so as to connect the event generator 24 of the first bridge unit 22 to the communication channel 72 of the interconnect 70. Software stored in the second code memory 48 can instruct the second processor 44 to configure the second bridge unit 52 to close the switched connection 76 so as to connect the event receiver 56 of the second bridge unit 52 to the communication channel 72 of the interconnect 70. In this way, a communication path is established between the event generator 24 of the first bridge unit 22 and the event receiver 56 of the second bridge unit 52.

Software executing on the first processor 14 can then cause the event generator 24 of the first bridge unit 22 to signal an event to the event receiver 56 of the second bridge unit 52. This is done by the first processor 14 writing a bit to a task register 24a associated with the event generator 24. (It will be appreciated that the physical location of the task register 24a may be remote from other parts of the bridge unit 22; it could be physically located in a block with the RAM 20, for instance.) The event signal will then travel from the event generator 24 of the first bridge unit 22, over the switched connection 73 to the communication channel 72, then over the switched connection 76 from the communication channel 72 to the event receiver 56 of the second bridge unit 52.

The event receiver 56 can communicate the event to the second processor 44 and/or to one or more of the peripherals 46 by any appropriate mechanism. The event receiver 56 may, for instance, change the value of an "event received" register associated with the event receiver 56. The second processor 44 and/or a peripheral 46 could poll this register at intervals. Rather than having the second processor 44 poll the register, it can be more efficient for the event receiver 56 to send an interrupt to the second processor 44, via the interrupt line 94, in response to receiving the event signal over the interconnect 70. Whether or not an interrupt is sent may be configurable (i.e., can be turned on or off) by the second processor 44, based on a value written to a configuration register for the bridge unit 52.

The second bridge unit 22 has corresponding features to the first bridge unit 52.

The event signal itself does not contain any information other than to signal that something has occurred. The shared memory 90 can be used to carry additional information between the first and second processors 14, 44—e.g., in the form of command/event queues. It is up to the software to assign a logical functionality to the communication channel 72. For instance, the communication channel 72 could be used by the first processor 14 to signal that a command, which the first processor 14 has written to a predefined address in the shared memory 90, is ready to be executed; the second processor 44 can subscribe to the communication channel 72 (by closing the switched connection 76) in order to be notified that the command is ready, and can fetch the command from the predefined address, and execute the command.

The software executing on the two subsystems 10, 40 could alternatively establish a communication path from the event generator 54 of the second bridge unit 52 to the event receiver 26 of the first bridge unit 22, by setting the switched connections 73-76 appropriately. The second processor 44 can then write to a task register 54a to cause the event generator 54 of the second bridge unit 52 to send an event signal over the communication channel 72 to the first bridge unit 22, which may interrupt the first processor 14 via the interrupt line 92.

In some situations, it may be possible to close all four switched connections 73-76—e.g., where each subsystem 10, 40 is able to distinguish between an event signal from the other subsystem, and an event signal that has looped back from the bridge unit 22, 52 that issued it, which could be due to temporal context, or by communication via the shared memory 90, etc.

Figure 2:
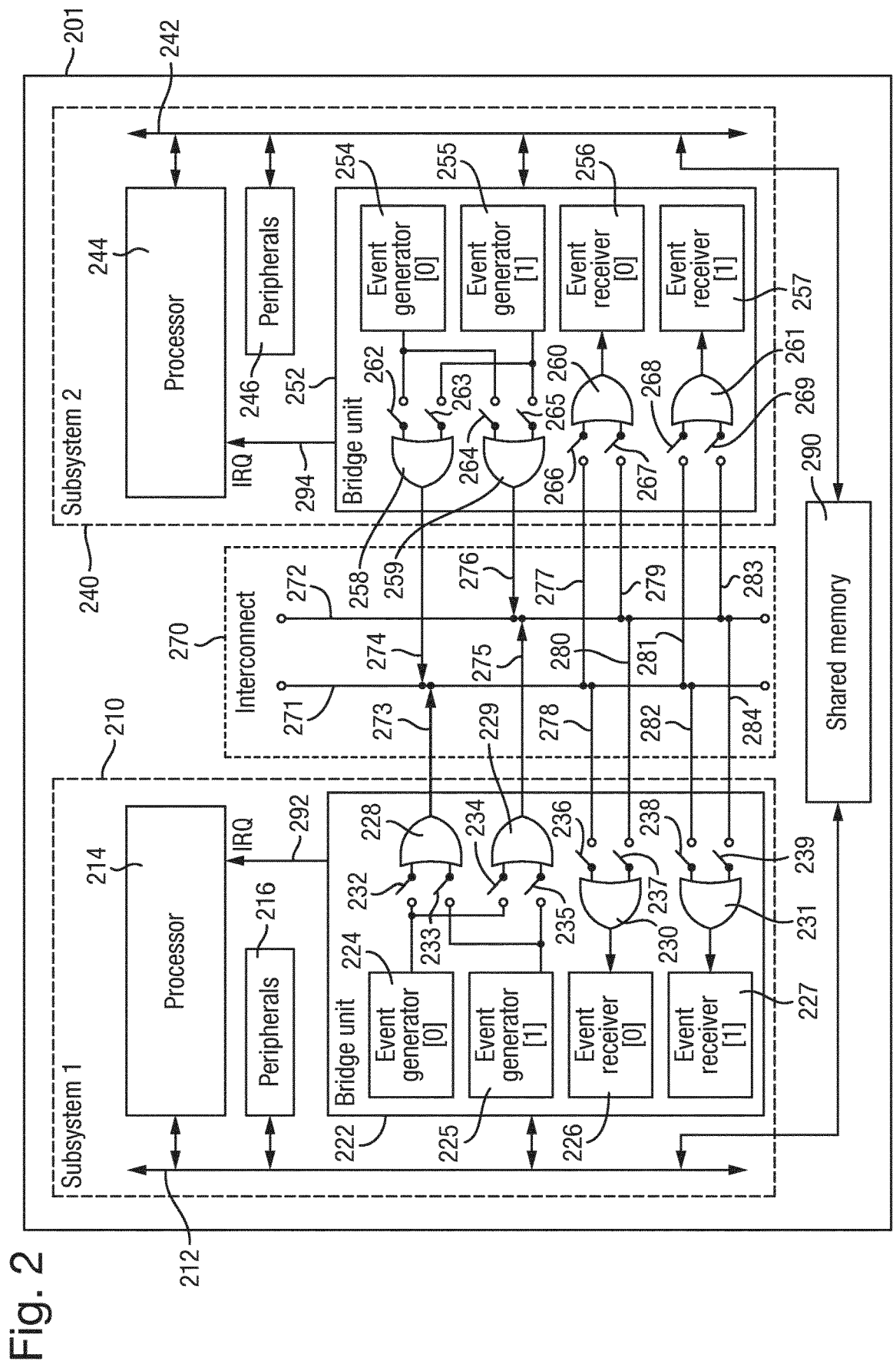
FIG. 2 is a schematic drawing showing components of a second integrated circuit device, in accordance with the invention, which comprises two different subsystems connected by an interconnect.

FIG. 2 shows another embodiment of a device 201 that is similar to the device 1 of FIG. 1, but in which the interconnect 270 supports two communication channels 271, 272, rather than just one channel 70. Equivalent features from FIG. 1 are labelled with like numbers plus 200 in FIG. 2.

In this embodiment, the first bridge unit 222 contains two event generators 224, 225 and two event receivers 226, 227. The second bridge unit 252 also contains two event generators 254, 255 and two event receivers 256, 257.

Each of the event generators 224, 225 in the first bridge unit 222 has a respective output line that branches into two switched lines 232, 234 and 233, 235. The first switched branch line 232, 233 from each event generator 224, 225 feeds into a first event-generating OR gate 228, while the second switched branch line 234, 235 from each event generator 224, 225 feeds into a second event-generating OR gate 229. The output of the first event-generating OR gate 228 is connected to the first communication channel 271 in the interconnect 270. The output of the second event-generating OR gate 229 is connected to the second communication channel 272 in the interconnect 270.

The second bridge unit 252 has a corresponding arrangement of two event-generating OR gates 258, 259, fed by respective switched lines 262, 263 and 264, 265, from its two event generators 254, 255.

Each of the event receivers 226, 227 in the first bridge unit 222 has a respective input line that is the output of a respective one or two event-receiving OR gates 230, 231. The first event-receiving OR gate 230 has two switched input lines 236, 237 which are switchably connected to the first communication channel 271 and the second communication channel 272 respectively. The second event-receiving OR gate 231 has two switched input lines 238, 239 which are also switchably connected to the first communication channel 271 and the second communication channel 272 respectively.

The second bridge unit 252 has a corresponding arrangement of a first event-receiving OR gate 260, fed by switched lines 266, 267 from the first and second communication channels 271, 272 respectively, and outputting to the first event receiver 256; and a second event-receiving OR gate 261, fed by switched lines 268, 268 from the first and second communication channels 271, 272 respectively, and outputting to the second event receiver 257.

In use, the first and second processors 214, 244 can set the switches 232-239, 262-269 appropriately to connect any one or more of the event generators 224, 225, 254, 255, and any one or more of the event receivers 226, 227, 256, 257, to the first and/or second communication channels 271, 272.

It is possible, for example, to connect the first event generator 224 in the first bridge unit 222 to the first communication channel 271, and to connect both event receivers 256, 257 in the second bridge unit 252 to the first communication channel 271, such that one event signal initiated by the first processor 214 can cause two event receivers 256, 257 on the second subsystem 240 to respond.

Figure 3:
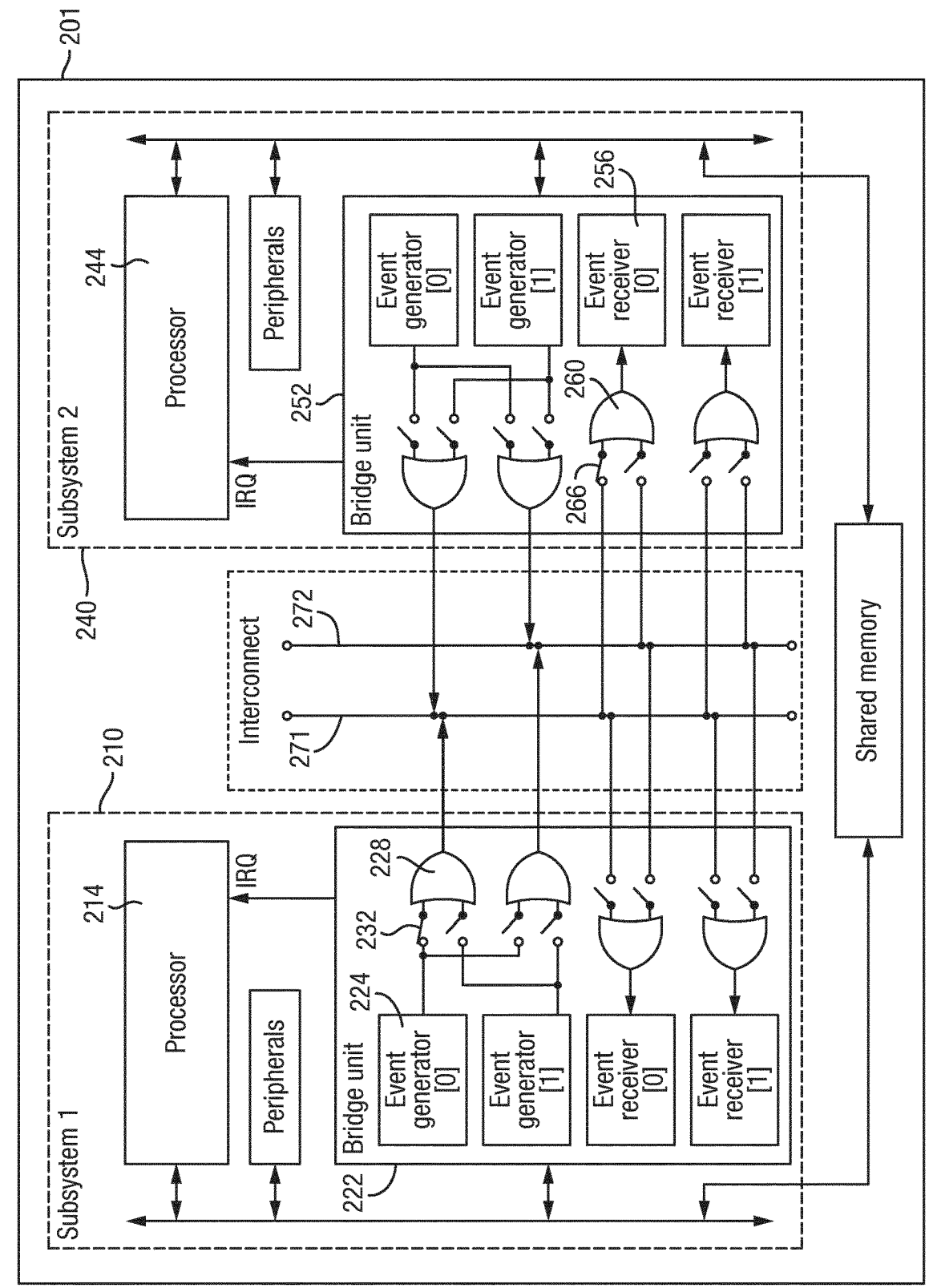
FIG. 3 shows a first configuration of the integrated circuit device of FIG. 2.

FIG. 3 shows another example configuration of the device 201 in which the processor 214 of the first subsystem 210 has closed the switched line 232 leading from the first event generator 224 of the first bridge unit 222 to the event-generating OR gate 228 that outputs to the first communication channel 271. The processor 244 of the second subsystem 240 has closed the switched line 266 leading from the first communication channel 271 to the event-receiving OR gate 260 that outputs to the first event receiver 256 of the second bridge unit 252. All the other switched lines are open. Thus, in this example, the first processor 214 can trigger an interrupt on the second processor 244 by means of an event signal (which may be a rising edge, a falling edge, a pulse, or any other suitable signal) on the first communication channel 271. In this example, the second communication channel 272 is not used.

Figure 4:
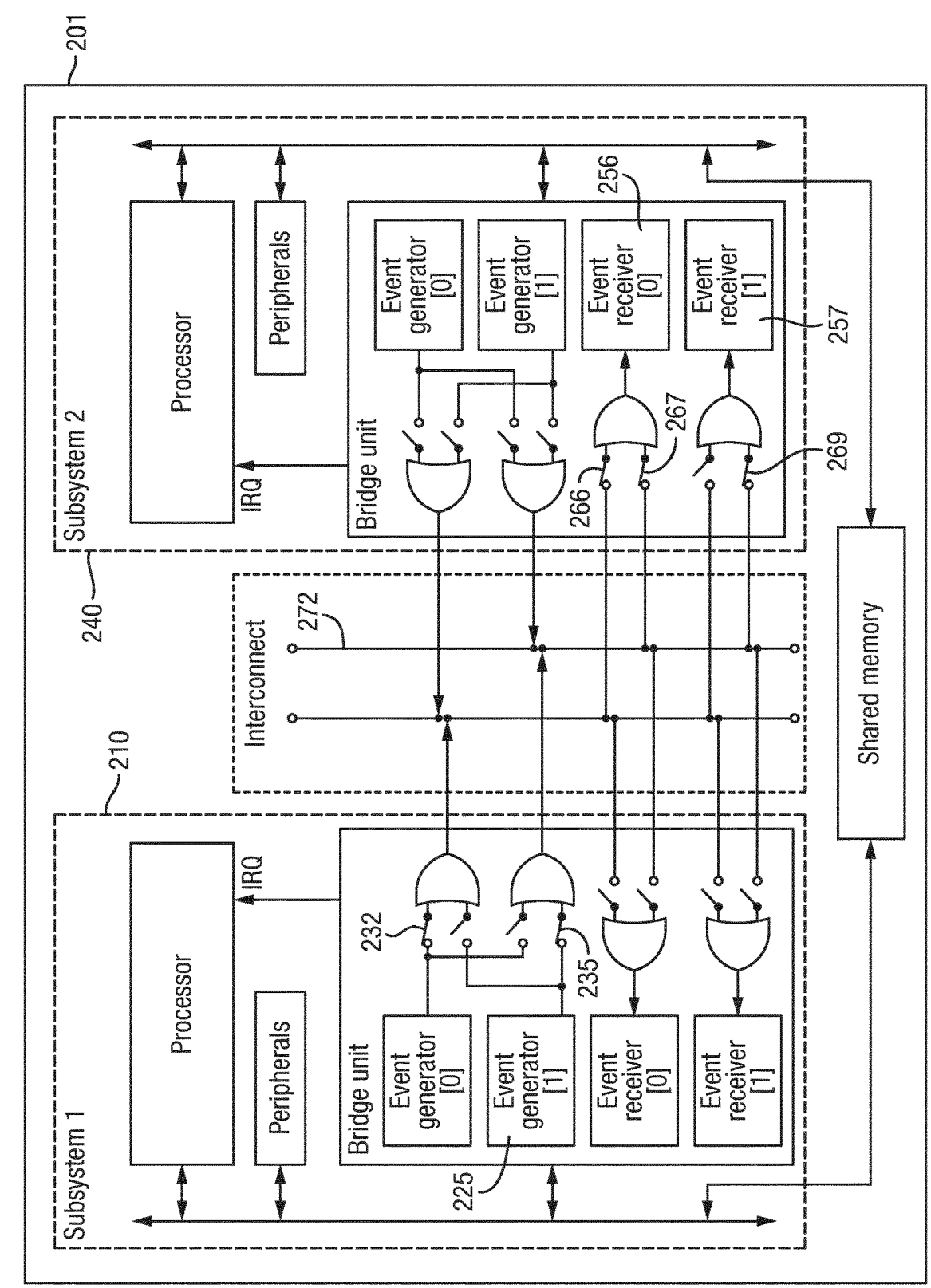
FIG. 4 shows a second configuration of the integrated circuit device of FIG. 2.

FIG. 4 shows a more complex configuration of the same device 201 in which, in addition to the switches 232 and 266 already mentioned with reference to FIG. 3, a further three switched lines 235, 266, 267 have been closed so as to connect the second event generator 225 of the first subsystem 210 to the second communication channel 272, and so as also to connect the first and second event receivers 256, 257 of the second subsystem 240 to the second communication channel 272. Thus, an event signaled by the second event generator 225 of the first subsystem 210 will be received by two event receivers 256, 257 on the second subsystem 240. This may be useful where—for example—a first one of the peripherals 246 is configured to respond to one of the event receivers 256, 257, and a second one of the peripherals 246 is configured to respond to the other of the event receivers 257, 256. and it is desired, in a certain configuration, for both peripherals to respond to an incoming signal from the first subsystem 210.

In other configurations, one of the communication channels 271, 272 may be used to communicate from the first subsystem 210 to the second subsystem 240, while the other of the communication channels 272, 271 is used to communicate in the other direction, from the second subsystem 240 to the first subsystem 210.

It will be appreciated that the same architecture shown in FIG. 2 may be scaled up or down to support any number of event generators and any number of event receivers on each subsystem. The number of communication channels in the interconnect 270 may also be varied. A subsystem having N event generators may have a number of event-generating OR gates equal to the number, C, of communication channels, each event-generating OR gate having N switched inputs, one switched input from each of the N event generators, and each outputting to a respective one of the communication channels. A subsystem having M event receivers may have M event-receiving OR gates, each having C switched inputs, one switched input from each of the C communication channels, and each outputting to a respective one of the event receivers.

Additional subsystems, similar or identical to the first and second subsystems 214, 244, may also be switchably connected to the interconnect 270.

In some configurations, an event signal from one event generator may be received by multiple event receivers. In some configurations, one event receiver may receive event signals from multiple event generators.

Figure 5:
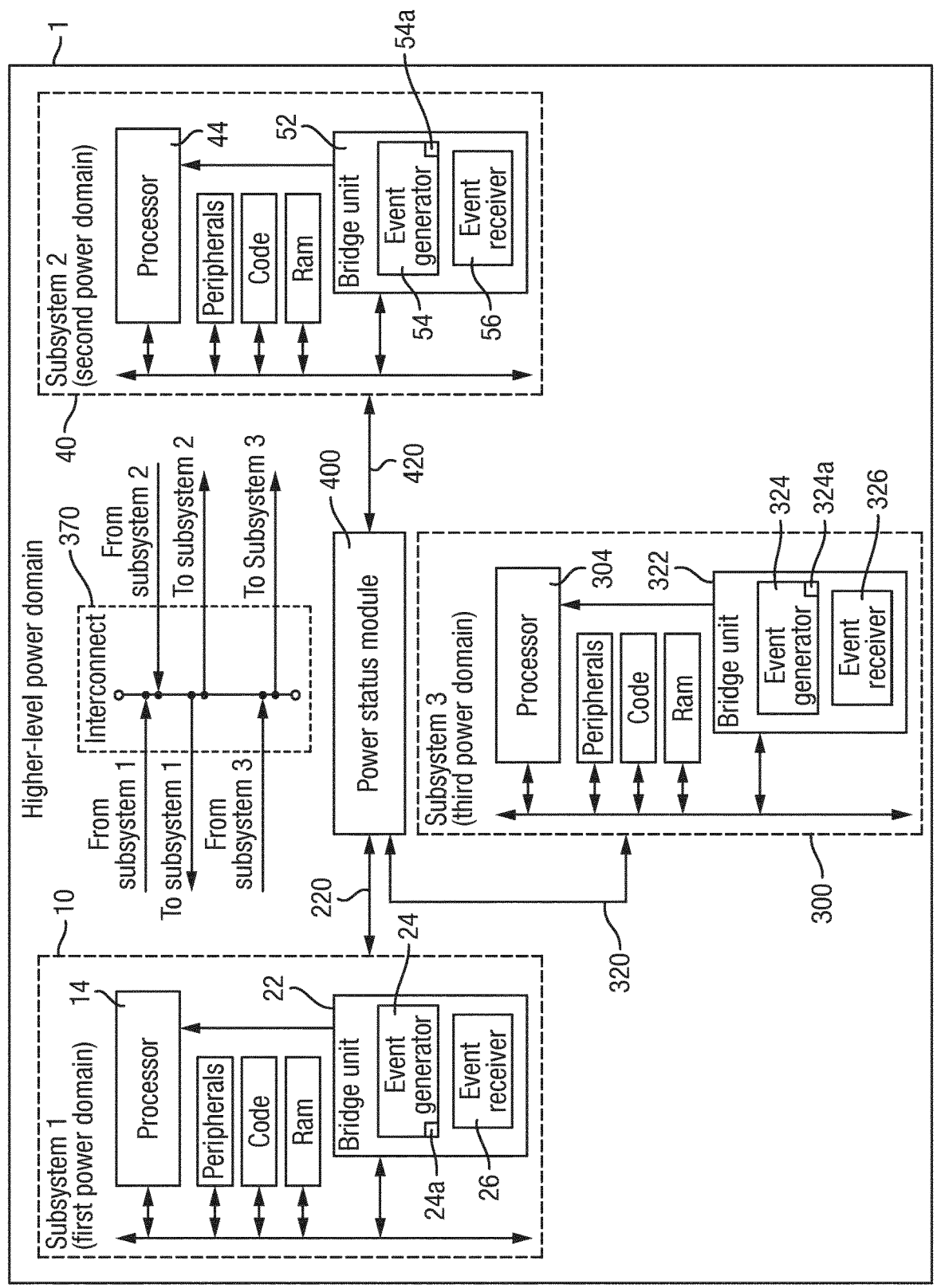
FIG. 5 shows power domains of exemplary processors within a higher-level power domain, illustrating the structure required for a processor to wake another processor from a sleep state using the electrical interconnect of the present invention.

FIG. 5 shows an integrated MCU 1 with a first subsystem 10, a second, separate subsystem 40 and a third, separate subsystem 300. There may be any number of subsystems. The first, second and third subsystems are similar to the subsystems described above.

In this embodiment, the first subsystem 10 is in a first power domain, the second subsystem 40 is in a second power domain, and the third subsystem 300 is in a third power domain. As shown in FIG. 5, the first power domain, the second power domain and the third power domain are subsidiary power domains that are part of a "higher-level" power domain.

In some embodiments, each subsystem may have multiple power domains. For example, the processor 14 of subsystem 10 may be in a different power domain to the bridge unit 22 of subsystem 10.

The higher-level power domain includes a power status module 400 that monitors the power-on status of each subsidiary power domain.

Bridge units of power domains that are powered up may, prior to sending an event signal, send a power-on request signal to the power status module 400. The power status module 400 may monitor for event signals or power-on request signals from any of the subsidiary power domains. If an event signal or a power-on request signal is detected, then in this embodiment the power status module 400 turns on all of the subsidiary power domains. In other embodiments, only one, or some, of the other subsidiary power domains are turned on. A subsidiary power domain is turned on, for example, by the power status module 400 turning on a power switch of the subsidiary power domain that is powered down.

The bridge units of the power domains that are turned on by the power status module 400 then each send a power-on report signal to the power status module 400. The power-on report signal from each bridge unit informs the power status module 400 that the respective power domains are now on. The power-on report signal may be sent once or may be sent continuously (e.g. by holding a line in a logic high state). Upon receiving all of the power-on report signals, the power status module 400 sends a ready signal to the bridge unit that sent the power-on request signal to the power status module. This informs this bridge unit that all of the power domains have been turned on.

After receiving the ready signal from the power status module 400, the bridge unit that sent the power-on request may send a wake-up event signal over the electrical interconnect 370 to another bridge unit, which may then send an interrupt to its respective processor. If the respective processor is still in a sleep state, receiving the interrupt may cause the processor to wake up from the sleep state.

For example, it is possible for the first processor 14 to wake the second and third processors 44, 304, when the second and third processors are in a sleep state. Software executing on the first processor 14 can cause the event generator 24 of the first bridge unit 22 to generate and send a power-on request signal to the power status module 400. The power status module 400 may receive this power-on request signal and turn on power switches of the power domains of the second and third processors 44, 304, which then causes the second and third power domains to be powered up.

Once the second and third power domains are powered up, the bridge units 52, 322 of the second and third power domains send a power-on report signal to the power status module 400. Upon receiving all of the power-on report signals from the respective bridge units, the power status module 400 sends a ready signal to the first bridge unit 22. The event generator of the first bridge unit 22 then sends a wake up event signal to the bridge units 52, 322 of the second and third processors over the electrical interconnect 370. The bridge units 52, 322 of the second and third subsystems receive the wake-up event signal sent from the first bridge unit 22. The bridge units 52, 322 of the second and third subsystems then each send a wake-up interrupt signal to their respective processors 44, 304. The second and third processors 44, 304 wake from a sleep state in response to receiving the wake-up interrupt signal from their respective bridge units 52, 322.

It is possible for any subsystem's processor to wake another subsystem's processor in this manner, as long as the higher-level power domain remains turned on.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated circuit device comprising:
   first processing circuitry comprising:
      a first local bus;
      a first processor connected to the first local bus;
      a first set of one or more local peripherals connected to the first local bus; and
      first bridge unit circuitry connected to the first local bus;
   second processing circuitry comprising:
      a second local bus;
      a second processor connected to the second local bus;
      a second set of one or more local peripherals connected to the second local bus;
      second bridge unit circuitry connected to the second local bus;
      a local-event line, between the second bridge unit circuitry and a peripheral of the second set of peripherals, for sending a local event signal from the second bridge unit circuitry to said peripheral; and
   an electrical interconnect between the first bridge unit circuitry and the second bridge unit circuitry,
   wherein:
      the first processing circuitry, the second processing circuitry, and the electrical interconnect are integrated on a common semiconductor substrate;
      the first bridge unit circuitry comprises a task register, accessible over the first local bus;
      the first bridge unit circuitry is configured for:
         detecting a write to the task register; and
         responding to the write by sending an event signal over the electrical interconnect to the second bridge unit circuitry, and the second bridge unit circuitry is configured for:
            receiving the event signal from the first bridge unit circuitry;
            sending an interrupt signal to the second processor in response to receiving the event signal; and
            sending a local event signal to a peripheral of the second set of peripherals in response to receiving said event signal or a further event signal over the electrical interconnect.

2. The integrated circuit device of claim 1, wherein said peripheral of the second set of peripherals is a programmable peripheral interface, and wherein the second processing circuitry comprises one or more event lines connecting the programmable peripheral interface to one or more further peripherals of the second set of peripherals.

3. The integrated circuit device of claim 1, wherein the first processing circuitry comprises a line, between a peripheral of the first set of peripherals and the first bridge unit circuitry, for sending a task signal from said peripheral to the first bridge unit circuitry, wherein the first bridge unit circuitry is configured for responding to receiving such a task signal from said peripheral by sending an event signal over the electrical interconnect to the second bridge unit circuitry.

4. The integrated circuit device of claim 1, wherein the second processor is configured to wake from a sleep state in response to receiving the interrupt signal from the second bridge unit circuitry.

5. The integrated circuit device of claim 4, wherein:
   the first processor is in a first power domain, the second processor is in a second power domain, and the first and second power domains are in a higher-level power domain;
   the integrated circuit device further comprises power status circuitry;
   the first bridge unit circuitry is configured to send a power-on request signal to the power status circuitry;
   the power status circuitry is configured to, upon receipt of said power-on request signal from the first bridge unit circuitry, turn on a power switch of the second power domain;
   the second power domain is configured to power up upon said turning on of said power switch and, following said power up, to send a power-on report signal to the power status circuitry;
   the power status circuitry is configured, upon receiving the power-on report signal from the second power domain, to send a ready signal to the first bridge unit circuitry;
   the first bridge unit circuitry is configured, upon receiving the ready signal from the power status circuitry, to send a wake-up event signal to the second bridge unit circuitry over the electrical interconnect;
   the second bridge unit circuitry is configured to receive the wake-up event signal from the first bridge unit circuitry over the electrical interconnect and to send an interrupt signal to the second processor upon receiving the wake-up event signal;
   the second processor is configured to wake from said sleep state in response to receiving the interrupt signal from the second bridge unit circuitry.

6. The integrated circuit device of claim 1, wherein the second processor is configured to execute an interrupt routine in response to receiving the interrupt signal.

7. The integrated circuit device of claim 1, further comprising a shared memory, wherein the first processing circuitry and the second processing circuitry are configured to access the shared memory.

8. The integrated circuit device of claim 7, comprising code memory, the code memory storing first software instructions which, when executed by the first processor, cause the first processor to write data to the shared memory, and further storing second software instructions which, when executed by the second processor, cause the second processor to read data from the share memory in response to the second processor receiving the interrupt signal.

9. The integrated circuit device of claim 1, wherein the first bridge unit circuitry is able to receive a signal from one or more of the first set of local peripherals when the first processor is in a sleep state.

10. The integrated circuit device of claim 1, wherein the first bridge unit circuitry is in a first clock domain, and wherein the second bridge unit circuitry is in a second clock domain, different from the first clock domain, and wherein the event signal is sent over the interconnect asynchronously.

11. The integrated circuit device of claim 1 comprising further processing circuitry, the further processing circuitry comprising:
 a further local bus;
 a further processor connected to the local bus;
 a further set of one or more local peripherals connected to the local bus; and
 further bridge unit circuitry connected to the local bus,
wherein the further bridge unit circuitry comprises a further task register, and is configured for:
 detecting a write to the task register; and
 responding to the write by sending an event signal over the electrical interconnect.

12. The integrated circuit device of claim 11, wherein the further bridge unit circuitry is configured for:
 receiving an event signal over the electrical interconnect; and
 sending an interrupt signal to the further processor in response to receiving the event signal.

13. The integrated circuit device of claim 11, wherein each processor is in a separate power domain that is part of a higher-level power domain;
 wherein the power status circuitry is configured to:
 detect a power-on request signal from any of the bridge unit circuitry; and
 in response to detecting the power-on request signal from any of the bridge unit circuitry, turn on a respective power switch of the power domain of one, some or all of the processors;
 wherein:
 each power domain is configured to power up upon turning on of its respective power switch, and following power up, to send a power-on report signal to the power status circuitry;
 the power status circuitry is configured, upon receiving said power-on report signals, to send a ready signal to the bridge unit circuitry that sent the power-on request;
 the bridge unit circuitry of each processor is configured, upon receiving said ready signal, to send a wake-up event signal to the bridge unit circuitry of another processor in a sleep state;
 the bridge unit circuitry of each respective processor is configured to send an interrupt to each respective processor upon receipt of the wake-up event signal; and
 each processor is configured to wake from a sleep state in response to receiving the interrupt from the respective bridge unit circuitry.

14. A method of operating an integrated circuit device, the integrated circuit device comprising:
 first processing circuitry comprising:
 a first local bus;
 a first processor connected to the first local bus;
 a first set of one or more local peripherals connected to the first local bus; and
 first bridge unit circuitry connected to the first local bus and comprising a task register, accessible over the first local bus;
 second processing circuitry comprising:
 a second local bus;
 a second processor connected to the second local bus;
 a second set of one or more local peripherals connected to the second local bus;
 second bridge unit circuitry connected to the second local bus; and
 a local-event line, between the second bridge unit circuitry and a peripheral of the second set of peripherals, for sending a local event signal from the second bridge unit circuitry to said peripheral; and
 an electrical interconnect between the first bridge unit circuitry and the second bridge unit circuitry,
 wherein the method comprises:
 writing, by the first processor, or one or more of the first set of local peripherals, to the task register of the first bridge unit circuitry;
 detecting, by the first bridge unit circuitry, the write to the task register and responding by sending, by the first bridge unit circuitry, an event signal over the electrical interconnect to the second bridge unit circuitry;
 receiving, by the second bridge unit circuitry, the event signal from the first bridge unit circuitry and responding by sending, by the second bridge unit circuitry, an interrupt signal to the second processor; and
 sending, by the second bridge unit circuitry, a local event signal to a peripheral of the second set of peripherals in response to receiving said event signal, or in response to receiving a further event signal over the electrical interconnect.

15. The method of claim 14, wherein:
 the first processor is in a first power domain, the second processor is in a second power domain, and the first and second power domains are in a higher-level power domain;
 the integrated circuit device further comprises power status circuitry;
 the first bridge unit circuitry sends a power-on request signal to the power status circuitry;
 the power status circuitry upon receipt of the power-on request signal from the first bridge unit circuitry, turns on a power switch of the second power domain;
 the second power domain powers up upon turning on of said power switch and sends a power-on report signal to the power status circuitry;
 the power status circuitry, upon receiving said power-on report signal, sends a ready signal to the first bridge unit circuitry;

the first bridge unit circuitry, upon receiving the ready signal from the power status circuitry, sends a wake-up event signal to the second bridge unit circuitry over the electrical interconnect;

the second bridge unit circuitry receives the wake-up event signal from the first bridge unit circuitry over the electrical interconnect and sends an interrupt signal to the second processor upon receiving the wake-up event signal; and the second processor wakes from said sleep state in response to receiving the interrupt signal from the second bridge unit circuitry.

16. The method of claim 14, wherein said peripheral of the second set of peripherals is a programmable peripheral interface, and wherein the second processing circuitry comprises one or more event lines connecting the programmable peripheral interface to one or more further peripherals of the second set of peripherals.

17. The method of claim 14, wherein the first processing circuitry comprises a line, between a peripheral of the first set of peripherals and the first bridge unit circuitry, for sending a task signal from said peripheral to the first bridge unit circuitry, and wherein the method further comprises:

the first bridge unit circuitry receiving a task signal, over said line, from said peripheral of the first set of peripherals; and in response, the first bridge unit circuitry sending a second event signal over the electrical interconnect to the second bridge unit circuitry.

18. An integrated circuit device comprising:
first processing circuitry comprising:
　a first local bus;
　a first processor connected to the first local bus;
　a first set of one or more local peripherals connected to the first local bus;
　first bridge unit circuitry connected to the first local bus; and
　a line, between a peripheral of the first set of peripherals and the first bridge unit circuitry, for sending a task signal from said peripheral to the first bridge unit circuitry;

a second processing circuitry comprising:
　a second local bus;
　a second processor connected to the second local bus;
　a second set of one or more local peripherals connected to the second local bus; and
　second bridge unit circuitry connected to the second local bus; and an electrical interconnect between the first bridge unit circuitry and the second bridge unit circuitry, wherein:
　the first processing circuitry, the second processing circuitry, and the electrical interconnect are integrated on a common semiconductor substrate;
　the first bridge unit circuitry, comprises a task register, accessible over the first local bus;
　the first bridge unit circuitry is configured for:
　　detecting a write to the task register; and
　　responding to the write by sending an event signal over the electrical interconnect to the second bridge unit circuitry; and
　the second bridge unit circuitry is configured:
　　receiving the event signal from the first bridge unit circuitry; and
　　sending an interrupt signal to the second processor in response to receiving the event signal, and
　wherein the first bridge unit circuitry is configured for responding to receiving a task signal, over said line, from said peripheral of the first set of peripherals by sending a second event signal over the electrical interconnect to the second bridge unit circuitry.

19. The integrated circuit device of claim 18, wherein said peripheral of the first set of peripherals is a programmable peripheral interface, and wherein the first processing circuitry comprises one or more task lines connecting one or more further peripherals of the first set of peripherals to the programmable peripheral interface.

* * * * *